US009973530B2

(12) United States Patent
Hobe et al.

(10) Patent No.: US 9,973,530 B2
(45) Date of Patent: May 15, 2018

(54) METHOD FOR PROVIDING A CONNECTION BETWEEN A COMMUNICATIONS SERVICE PROVIDER AND AN INTERNET PROTOCOL, IP, SERVER, PROVIDING A SERVICE, AS WELL AS A PERIMETER NETWORK, COMPRISING THE IP SERVER, AND AN IP SERVER PROVIDING THE SERVICE

(71) Applicant: Telefonaktiebolaget LM Ericsson (publ), Stockholm (SE)

(72) Inventors: Martin Hobe, Budel Dorplein (NL); Anne Brussaard, Rijen (NL); Rogier August Caspar Joseph Noldus, Goirle (NL); Erik-Jan Van Loenen, Woudrichem (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 15/102,394

(22) PCT Filed: Dec. 20, 2013

(86) PCT No.: PCT/EP2013/077715
§ 371 (c)(1),
(2) Date: Jun. 7, 2016

(87) PCT Pub. No.: WO2015/090452
PCT Pub. Date: Jun. 25, 2015

(65) Prior Publication Data
US 2017/0026406 A1 Jan. 26, 2017

(51) Int. Cl.
*H04L 29/06* (2006.01)
(52) U.S. Cl.
CPC ...... *H04L 63/1458* (2013.01); *H04L 63/0209* (2013.01); *H04L 63/0236* (2013.01);
(Continued)

(58) Field of Classification Search
None
See application file for complete search history.

(56) References Cited

U.S. PATENT DOCUMENTS 6,473,863 B1   10/2002   Genty et al.
6,898,632 B2 *  5/2005   Gordy ................. H04L 63/1408
                                                                 709/224
(Continued)

FOREIGN PATENT DOCUMENTS

EP          1833227 A1     9/2007

OTHER PUBLICATIONS

Wikipedia, "List of TCP and UDP port numbers" found at www.wikipedia.com on Sep. 29, 2017.*
(Continued)

*Primary Examiner* — Peter Poltorak
(74) *Attorney, Agent, or Firm* — Coats & Bennett, PLLC

(57) ABSTRACT

A method of providing at least one communications service provider a connection to an Internet Protocol, IP, server in a perimeter network, the IP server providing a service over a public IP network, the method comprising the steps of detecting, in the perimeter network, an irregularity in IP traffic arriving at the perimeter network over the public IP network, disregarding, in the perimeter network, IP traffic arriving at the perimeter network over the public IP network, and enabling, in the perimeter network, a connection between the IP server and the at least one communications service provider for the service provided by the IP server over at least one private IP network.

16 Claims, 6 Drawing Sheets

(52) U.S. Cl.
CPC ...... *H04L 63/0272* (2013.01); *H04L 63/1425* (2013.01); *H04L 65/1069* (2013.01)

(56) References Cited

U.S. PATENT DOCUMENTS

| | | | | |
|---|---|---|---|---|
| 7,159,237 | B2* | 1/2007 | Schneier | G06F 21/552 709/223 |
| 9,769,136 | B2* | 9/2017 | Shigapov | H04L 63/08 |
| 2002/0029276 | A1* | 3/2002 | Bendinelli | H04L 12/4641 709/227 |
| 2002/0099854 | A1* | 7/2002 | Jorgensen | H04L 1/20 709/249 |
| 2003/0110288 | A1 | 6/2003 | Ramanujan et al. | |
| 2003/0115480 | A1* | 6/2003 | McDysan | H04L 63/0272 726/36 |
| 2005/0144467 | A1* | 6/2005 | Yamazaki | H04L 63/0227 713/189 |
| 2006/0072527 | A1* | 4/2006 | Beck | G06F 21/34 370/338 |
| 2007/0210909 | A1* | 9/2007 | Addy | H04L 63/1458 340/506 |
| 2008/0102747 | A1* | 5/2008 | Alam | H04L 12/4641 455/3.05 |
| 2008/0186977 | A1* | 8/2008 | Nomi | H04L 29/12301 370/395.5 |
| 2012/0227102 | A1* | 9/2012 | Parla | H04L 63/0272 726/15 |
| 2013/0074176 | A1* | 3/2013 | Nishihata | H04L 63/0272 726/15 |

OTHER PUBLICATIONS

Khattab S., et al., "Proactive Server Roaming for Mitigating Denial-of-Service Attacks", International Conference on Information Technology: Research and Education, 2003. Proceedings. Aug. 11, 2003, pp. 286-290, IEEE.

Sardana, A., et al., "Autonomous Dynamic Honeypot Routing Mechanism for Mitigating DDoS Attacks in DMZ", 2008 16th IEEE International Conference on Networks, Dec. 12, 2008, pp. 1-7, IEEE.

GSM Association, "Inter-Service Provider IP Backbone Guidelines", GSM Association Official Document: IR.34, Jan. 31, 2007, pp. 1-45, version 4.1.

Wikipedia, "Denial-of-service attack", Dec. 17, 2013, pp. 1-15, retrieved on Jun. 1, 2016, retrieved from internet: https://en.wikipedia.org/w/index.php?title=Denial-of-service_attack&oldid=586418593.

* cited by examiner

METHOD FOR PROVIDING A CONNECTION BETWEEN A COMMUNICATIONS SERVICE PROVIDER AND AN INTERNET PROTOCOL, IP, SERVER, PROVIDING A SERVICE, AS WELL AS A PERIMETER NETWORK, COMPRISING THE IP SERVER, AND AN IP SERVER PROVIDING THE SERVICE

TECHNICAL FIELD

The present invention generally relates to a method for providing a connection between at least one communications service provider and an IP server and, more specifically, to method steps performed to enable such a connection.

BACKGROUND

Nowadays, consumers and businesses are becoming increasingly dependent on public internet services like online banking, government sites, credit card sites, etc. Such a dependency increases the requirements on the constant availability of the sites hosting these services. Unavailability, for example, can cause harm to the economic society. Consumers may lose their trust in these internet based services, which may impact the economy.

Unavailability of these services may be caused by malfunctioning of the network, malfunctioning of servers hosting the services, malfunctioning of the services themselves, and attacks on these services by third parties. One of the possible attack types is (Distributed) Denial of Service, DDoS. A DDoS comprises an attempt to temporarily or indefinitely interrupt or suspend services of a server connected to a public network, such as the internet.

A DoS attack is performed from a single source to flood a targeted server with so much (bogus) traffic or queries that this server becomes unable to operate in a normal manner, and a DDoS attack is essentially the same type of attack, but then performed simultaneously from multiple sources.

The symptoms of a DDoS attack comprise, amongst other, slow or unresponsive network performance, unresponsive or unavailable applications and/or services.

In the case of a DDoS attack on a particular internet service, one form of protection is, currently, to temporarily block specific or all incoming and outgoing IP traffic for, at least, that service in question. Such a blocking is activated by the firewall of the server/host of that service as soon as a DDoS attack is detected or suspected.

An internet service may relate to Simple Mail Transfer Protocol email, SMTP, Hypertext Transfer Protocol, HTTP, File Transfer Protocol, FTP, Voice over IP, VoIP, etc.

Unavailability of the internet service may also be caused by problems in, for example, specific IP routers or DNS servers of the public internet, an error condition in the IP infrastructure of an Autonomous System (AS) that the IP server is connected to, etc. Result of the unavailability of the server, regardless of the cause of the unavailability, is that consumers and businesses are not able to access the internet service.

The protection advocated by the prior art, i.e. to temporarily block specific or all incoming and outgoing IP traffic once a DDoS attack is detected, protects the IP server and the service provided, but it does not provide for a solution to the unavailability aspect. The IP server and/or the provided service will still be unavailable at least during the DDoS attack.

SUMMARY

It is an object of the present invention to provide an improved method of providing a connection between at least one communications service provider and an Internet Protocol, IP, server in a perimeter network, wherein the IP server is providing a service over a public IP network.

It is another object to provide a perimeter network, comprising an Internet Protocol, IP, server providing a service, wherein the perimeter network is arranged for supporting the improved method.

It is a further object to provide an IP server arranged for supporting the improved method of providing at least one communications service provider a connection to the IP server.

In a first aspect of the invention there is provided a method of providing at least one communications service provider a connection to an Internet Protocol, IP, server in a perimeter network, wherein the IP server is providing a service over a public IP network.

The method comprises the steps of detecting, in the perimeter network, an irregularity in IP traffic arriving at the perimeter network over the public IP network, disregarding, in the perimeter network, IP traffic arriving at the perimeter network over the public IP network, and enabling, in the perimeter network, a connection to the at least one communications service provider for the service provided by the IP server over at least one private IP network.

The method is based on the insight that, whenever an irregularity in IP traffic arriving at the perimeter network is detected, availability of the service may be guaranteed, i.e. a connection from the IP server to the at least one communications service provider may be enabled, using at least one private network.

In the context of the present invention, an irregularity comprises, amongst other, a sudden increase in IP traffic arriving at the perimeter network, a sudden increase in certain type(s) of requests arriving at the perimeter network, sudden increase in payload of IP packets arriving at the perimeter network, a sudden increase in IP traffic originating from a particular source, unexpected persistent absence of IP traffic arriving at the perimeter network, etc.

The private network may be, for example, a Virtual Private Network, VPN over the public IP network. Such a VPN enables a server to send and receive IP packets across a public IP network, while benefiting from the functionality, security and management policies of the VPN and, at the same time, not being affected by a temporary blocking of IP traffic to/from the public internet. The using of a VPN is usually done by establishing a virtual point-to-point connection through the use of dedicated connections, encryption, or a combination of the two.

One of the advantages of a VPN is that the network address, for example an IP address or a host name address, of the IP server is kept hidden from the public IP network. Therefore, a DDoS attack cannot be redirected to the VPN as its network address is unknown to the attacker.

Another example of a private network may be the IP Packet eXchange, IPX. IPX comprises a telecommunications interconnection infrastructure for the exchange of IP traffic between communications service providers, via IP based network-to-network interfaces.

With current technology, a DDoS attack cannot be redirected to the IPX connection as IPX is completely separated from the public IP network, both logically and physically. IPX is neither addressable nor visible from the public IP network, such as the internet.

In the context of the present invention, a communications service provider may be any of an internet service provider, ISP, and a mobile network operator, MNO. An ISP, for example, is a business or organization that offers user equipment access to the public IP network, such as the internet, and related services. An MNO is a telecommunications service provider organization that provides wireless voice and data communication for its subscribed mobile users, as well as internet connectivity.

The connection between the communications service provider and the IP server may be initiated by a User Equipment connected to the communications service provider. A user equipment is then able to access the service provided by the IP server over the connection between the communications service provider and the IP server.

In the case of an irregularity, such as a DDoS attack, is detected in the perimeter network, access from the UE to the service is provided using the connection over the private IP network. As such, the user equipment will not encounter any issues, such as service interruption or service unavailability, related to the detected irregularity.

A perimeter network, such as a, demilitarized zone network, DMZ, and screened subnet network, is usually a small network that is set up separately from an organization's personal network and the public IP network. The perimeter network allows external users to gain access to the specific servers located in the perimeter network. For example, the perimeter network may include the company's web server, so that web content can be sent to the public IP network. As such, the perimeter network is separated, isolated from the public IP network and from the organization's personal network.

A perimeter network is a network closest to a server of a public IP network. Usually a perimeter network is the final step an IP packet takes traversing one of your networks on its way to the public IP network, and conversely the first network encountered by incoming IP traffic from the public IP network.

In the context of the present invention, a perimeter network may also consist solely of the IP server, such that the IP server is arranged to perform the steps of any of the methods according to the present invention.

In the following, wording directed to a DoS attack may also be applicable for DDoS attacks, and vice versa.

In an example, the step of enabling by said perimeter network, a connection between the IP server and the at least one communications service provider for the service provided by the IP server over at least one private IP network comprises establishing the at least one private IP network between the at least one communications service provider and the IP server, and connecting the at least one communications service provider for the service provided by the IP server over the established at least one private IP network.

Once an irregularity in IP traffic arriving at the perimeter network is detected, the perimeter network may decide to automatically, and/or independently start establishing a private IP network between the communications service provider and the IP server. The inventors noted that it is not necessary that the private IP network is already established before the irregularity is detected.

The advantage of not establishing the private IP network before the irregularity is detected, is that the private IP network between the communications service provider and the perimeter network does not need to be maintained or supported when this private IP network is not used. The private IP network is only maintained or supported only in the case the private IP network is intended to be used, i.e. when an irregularity in IP traffic is detected.

In an example, the IP server is providing the service over the public IP network via a first public IP interface comprised in the IP server, and wherein the steps of establishing the at least one private IP network and connecting the at least one communications service provider are performed over a second IP interface comprised in the IP server.

It was the insight of the inventors that the private IP network should not be established over the first public IP interface, as this interface is facing the irregularity, for example the DDoS attack. As such, any signaling over the first public IP interface to establish the private IP network will most likely not succeed. As such, a second public IP interface is utilized for establishing the private IP network.

In another example, the step of enabling a connection between the IP server and the at least one communications service provider comprises enabling the connection over at least one pre-established private IP network between the at least one or more communications service provider and the IP server.

Here, the private IP network is pre-established between the communications service provider and the perimeter network or the IP server. Once an irregularity is detected, a connection over the pre-established private IP network is activated to secure IP traffic between these networks. In such a case, the private IP network may be established beforehand, even in some cases over the public IP network, using the first public interface. The advantage hereof is that no second public interface is required, as the private IP network is already (pre-)established.

In a further example, the step of enabling, in the perimeter network, a connection between the perimeter network and the at least one communications service provider for the service provided by the IP server over at least one private IP network, comprises enabling the connection over the at least one private IP network between the perimeter network and any of a Gateway General Packet Radio Service, GPRS, support Node GGSN and a Packet Data Network Gateway, PDN-Gw, comprised in the at least one communications service provider.

Internet Protocol packets from User Equipment are routed via any of the GGSN and the PDN-Gw as the primary access point for connecting to the communications provider network. As such, a connection between any of these servers, i.e. GGSN and PDN-Gw, and the perimeter network safeguards access from the UE to the IP server providing the service, even in the case of an irregularity in access to the service over public internet, such as a DDoS attack on the service.

In an example, the step of detecting the irregularity in IP traffic comprises detecting any of high load or overload in IP traffic arriving at the perimeter network over the public IP network, and absence of IP traffic arriving at the perimeter network for the service over the public IP network.

According to the present invention, a DDoS attack is considered to lead to an irregularity in IP traffic arriving at the perimeter network. A DDoS attack can be broadly divided in three types. Volume based attacks comprise, amongst other, User Datagram Protocol, UDP, floods, Internet Control Message Protocol, ICMP, floods, and other types of packet floods. The goal of such an attack is to saturate the bandwidth of the IP server. Magnitude thereof is usually measured in bits per second.

Protocol Attacks comprise Synchronize, SYN, message floods, fragmented packet attacks, Ping of Death, Smurf DDoS, etc. This type of attack consumes actual IP server resources, or those of intermediate communication equipment in the perimeter network, such as firewalls and load balancers. Magnitude hereof is measured in packets per second.

Application Layer Attacks comprise Slowloris, Zero-day DDoS attacks, DDoS attacks that target Apache, Windows or OpenBSD vulnerabilities, etc. Comprised of seemingly legitimate and innocent requests, the goal of these attacks is to crash the service provided by the IP server, such as the web service. Magnitude hereof is measured in requests per second.

Another specific form of irregularity is the absence of any IP traffic, or decrease in regular IP traffic, arriving at the perimeter network. This could be an indication of any malfunctioning in the public IP network, for example servers breaking down.

In an example, the step of disregarding IP traffic arriving at the perimeter network over the public IP network comprises any of dropping, blocking, rejecting and redirecting the IP traffic in the perimeter network.

This step may be performed by either one of a firewall comprised in the perimeter network, the IP server and the service. In the context of the present invention, a firewall is a software or hardware-based network security system that controls incoming and outgoing network IP traffic by analysing the IP packets and determining whether they should be allowed through or not, based on applied rule set. As such, the firewall is arranged to establish a barrier between a trusted, secure internal network, i.e. the perimeter network, and the public IP network.

In yet another example, the step of enabling, in the perimeter network, a connection between the IP server and the at least one communications service provider for the service provided by the IP server over at least one private IP network comprises the steps of determining, in the perimeter network, which communications service provider are subscribed to a controlled secure access service, and enabling, in the perimeter network, connections to the respective subscribed communications service providers for the service provided by the IP server over private IP networks.

In a second aspect of the invention, a perimeter network is provided, comprising an Internet Protocol, IP, server providing a service, the perimeter network being arranged for providing at least one communications service provider a connection to the IP server over a public IP network.

The perimeter network comprising a detector module operable to detect an irregularity in IP traffic arriving at the perimeter network over the public IP network, a disregarder module operable to disregard IP traffic arriving at the perimeter network over the public IP network, and an enabler module operable to enable a connection to the at least one communications service provider for the service provided by the IP server over at least one private IP network.

The detector module, the disregarder module and the enabler module may be comprised in a firewall of the perimeter network, in the IP server, or even in the service provided by the IP server.

In an example, the enabler module is further operable to establish the at least one private IP network between the at least one communications service provider and the IP server, and to connect the at least one communications service provider for the service provided by the IP server over the established at least one private IP network.

In another example, the IP server is providing the service over the public IP network via a first public IP interface comprised in the IP server, and wherein the enabler module is operable to enable a connection to the at least one communications service provider over a second IP interface comprised in the IP server.

In a further example, the enabler module is operable to enable the connection to the at least one communications service provider comprises enabling the connection over at least one pre-established private IP network.

In another example, the enabler module is operable to enable the connection over the at least one private IP network between the perimeter network and any of a Gateway General Packet Radio Service, GPRS, Support Node, GGSN, and a Packet Data Network Gateway, PDN-Gw, comprised in the at least one communications service provider.

In yet another example, the irregularity in IP traffic comprises any of overload in IP traffic arriving at the perimeter network over the public IP network, and absence of IP traffic arriving at the perimeter network for the service over the public IP network.

In a further example, the disregarder module is operable to disregard IP traffic arriving at the perimeter network over the public IP network, said disregarding comprising any of dropping, blocking, rejecting and redirecting the IP traffic in the perimeter network.

In yet a further example, the enabler module is operable to determine which communications service providers are subscribed to a controlled secure access service, and to enable connections to the respective subscribed communications service providers for the service provided by the IP server over private IP networks.

In a third aspect of the invention an internet protocol, IP, server providing a service is provided, wherein the IP server is arranged for providing at least one communications service provider a connection to the IP server over a public IP network.

The IP server comprising detector module operable to detect an irregularity in IP traffic arriving at the IP server over the public IP network, disregarder module operable to disregard IP traffic arriving at the IP server over the public IP network, and enabler module operable to enable a connection to the at least one communications service provider for the service provided by the IP server over at least one private IP network.

The Internet Protocol, IP, server may comprise a processor and a memory, wherein the memory comprising instructions executable by the processor, whereby the IP access point server is operative to perform any of the methods as described above.

In the context of the present invention, a module, device, equipment or the like may also be implemented as a computer program running on the processor.

The service provided by the IP server may, as an example, be a web service, i.e. for hosting a web site.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of communications service provider or public IP network.

DETAILED DESCRIPTION

Figure 1:
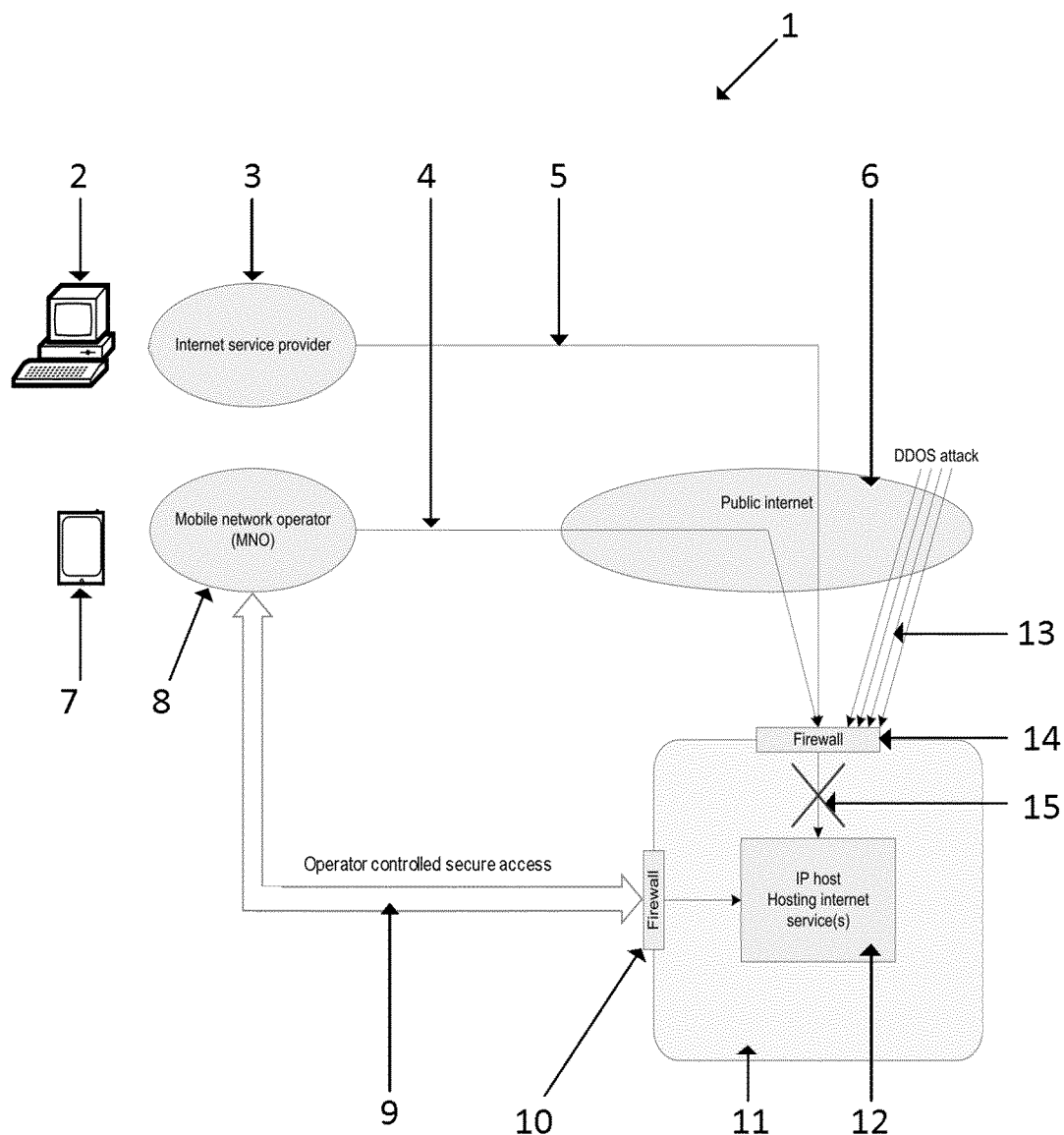
FIG. 1 is a block diagram illustrating a schematic view of a topology according to the present invention, comprising communications service providers, a public IP network and a perimeter network.

FIG. 1 is a schematic view of a topology 1 according to the present invention, comprising communications service providers 3, 8, a public Internet Protocol network 6 and a perimeter network 11.

Most administrators create a perimeter network 11 in order to place their firewall 10, 14 in between them and the outside world so that they can filter IP packet traffic. Most perimeter networks are part of the DMZ (Demilitarized Zone) if they exist at all. However, a perimeter network 11 may have some additional utilities that you might want to consider when deciding where to place systems and services.

The perimeter network 11 comprises two firewalls 10, 14 and an IP server 12 providing a service. The service may be, for example, a website for online banking. The first firewall 14 serves as a protective barrier between the IP server 12 and the public IP network, i.e. the public internet 6. The second firewall 10 serves as a protective firewall between the IP server 12 and a communications service provider, i.e. the Mobile Network Operator 8, MNO.

During normal operation, the service is provided over the public internet 6. A first user 2 may be able to access the public internet 6 via a communications service provider, in this case the internet service provider 3. A connection to the public internet 6 may be established via an access point comprised in the internet service provider 3.

The first user 2 is able to access 5 the service provided by the IP server 12, via its internet service provider 3 and the public internet 6. In the present example, any incoming and outgoing traffic needs to pass through the first firewall 14 comprised in the perimeter network 11.

The second user 7 connects to a communications service provider in the form of a mobile network operator 8. Such a connection may be established by a Gateway General Packet Radio Service, GPRS, Support Node, GGSN, comprised in the mobile network operator 8. The GGSN provides internet connectivity to its connected user equipment, for example the second user 7.

Access 4 for the second user 7 to the service provided by the IP server 12 is arranged in a similar manner as for the first user 2, i.e. via the mobile network operator 8 and the public internet 6 to the perimeter network 11.

The perimeter network 11 may be a Demilitarized Zone, DMZ. A DMZ is usually considered as a firewall configuration used to secure a local area network from the public internet 6. The present example displays a simplified perimeter network 11 comprising only one IP server 12. Perimeter networks may comprise of a plurality of IP servers, providing a plurality of services, as well as a plurality of firewalls. For simplicity reasons, only one server in the perimeter network 11 is included.

In another example according to the present invention, the IP server 12 itself may form the perimeter network 11. As such, the firewalls 14, 10 may be incorporated in the IP server 12.

The first firewall 14 comprises rules to allow the IP server 12 to send traffic to, and receive traffic from, programs, system services, servers, and/or users outside the perimeter network. Conventionally, firewall rules can be created to either allow or block IP packets arriving at the firewall.

In the present example, the first firewall 14 is set to allow all incoming and outgoing traffic related to the service provided by the IP server 12, i.e. the website for online banking.

The first firewall 14 of the perimeter network 11 is arranged to detect an irregularity in IP traffic arriving at the perimeter network 11, for example in the form of a Distributed Denial of Service, DDoS, attack 13.

Many different types of DDoS attacks exist, each of which directed to an overload situation such as a saturation of bandwidth of the IP server 12, saturation of resources of the IP server 12, a crash of the service provided by the IP server 12, or a combination thereof.

Once the DDoS attack 13 has been detected, the firewall 14 may take measures harvesting the effect that the perimeter network will disregard 15 any IP traffic arriving at the perimeter network 11 over the public IP network 6. In the context of the present invention, disregarding may comprise ignoring, blocking, dropping, rejecting and redirecting of arriving IP traffic.

Subsequently, the perimeter network 11 is arranged to enable a connection to the mobile network operator 8 for the service provided by the IP server over a private IP network 9.

Such a secure connection may relate to either IP Packet eXchange, IPX, or Virtual Private Network, VPN. IPX is, for example, an IP infrastructure that is used for secure IP communication between mobile network operators. In the case of a DDoS attack 13 to a particular internet service, such as a web service, the mobile network operator 8 can enable access to that internet service through the IPX. The internet service will then have an operational connection to IPX, and the IP server 12 will be able to accept Hypertext Transfer Protocol, HTTP, traffic for the web service via its connection to IPX.

Another option is to pre-establish a VPN tunnel between the mobile network operator 8 and the perimeter network 11 or the IP server 12 for the particular internet service. In the case of a web service, HTTP traffic through the VPN tunnel is to be accepted once the VPN tunnel is enabled and activated.

Figure 2:
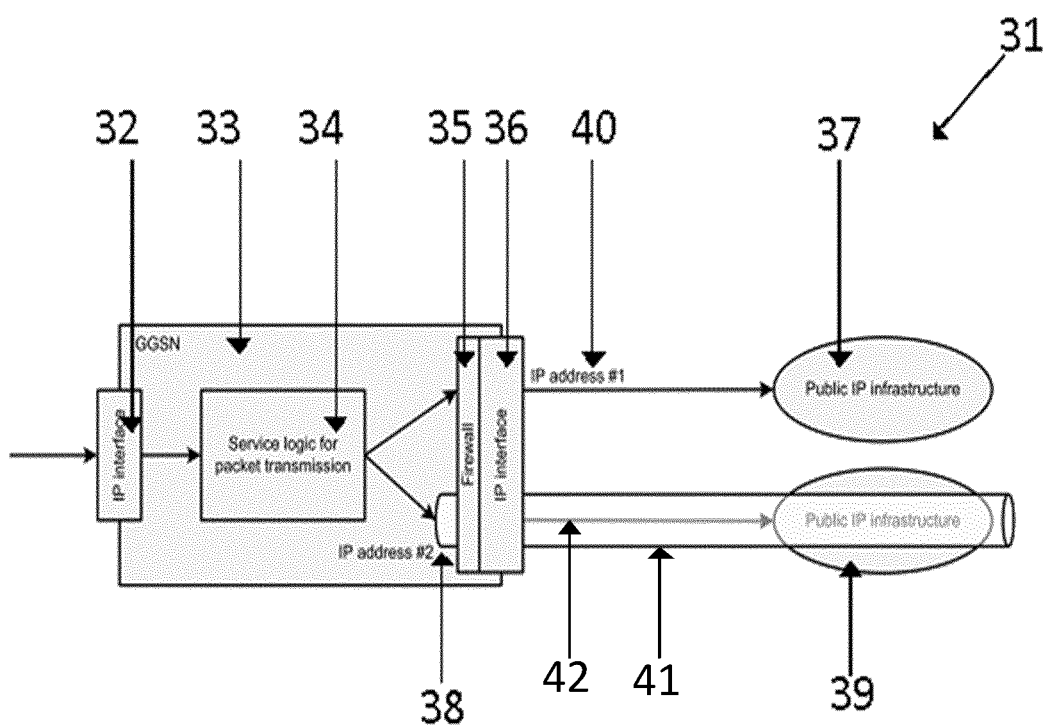
FIG. 2 is a block diagram illustrating a schematic view of a GGSN arranged to connect to the IP server over a private IP network, according to the present invention.

FIG. 2 is a schematic view of a GGSN 33 arranged to connect to the IP server over a private IP network 41, according to the present invention.

Here, the GGSN 33 comprises a first IP interface 32 arranged for receiving and transmitting IP packets to User Equipment, UE, having a functional connection to the GGSN 33. An incoming request from a UE for access to a particular service hosted by the IP server is received via the first IP interface 32.

The service logic for packet transmission 34 is arranged for determining whether the request should be sent over a regular connection 40 or over the private IP network 41, according to the present invention. During normal operation, any IP packet received from or sent to the IP server travels the normal route, i.e. via the public IP network 37, such as the internet.

In the present example, whenever the IP server, or the perimeter network wherein the IP server resides, detects an irregularity in incoming or outgoing IP traffic, it may decide to inactivate its public connection to the internet 37.

As such, the regular connection 40 over the internet 37 between the IP server and the GGSN 33 is no longer usable, as any IP packet over the regular connection 40 will not be processed by the IP server.

In such a case, the IP server may device to enable the secondary connection 42 over the private IP network 41 between the GGSN 33 and the IP server. In the present example, the private IP network 41 is a Virtual Private Network 41, VPN.

A VPN utilizes a public IP network 37, 39, to support private data communications. Most VPN implementations use the internet as the public IP network and a variety of specialized protocols to support private communications through the internet. VPN follows a client and server approach. VPN clients authenticate users, encrypt data, and otherwise manage sessions with VPN servers utilizing a technique called tunneling.

The VPN may be established or initiated either by the IP server or the perimeter network, or by the GGSN 33. FIG. 2 depicts that both the regular connection 40 as the secondary connection 42 are processed via the secondary IP interface 36 of the GGSN 33. The GGSN 33 may also be equipped with a firewall 35 to determine whether any IP packet to be sent or to be received should be allowed or not.

In the present example, the VPN 41 is established prior to the detection of an irregularity, but the VPN 41 is not being used during normal operation of the IP server. Once the IP server or the perimeter network detects an irregularity, leading to a sudden increased demand of resources of the IP server, the VPN 41 is being enabled, i.e. activated, such that the service provided by the IP server is made available via the VPN 41, and the regular connection 40 is disabled.

Figure 3:
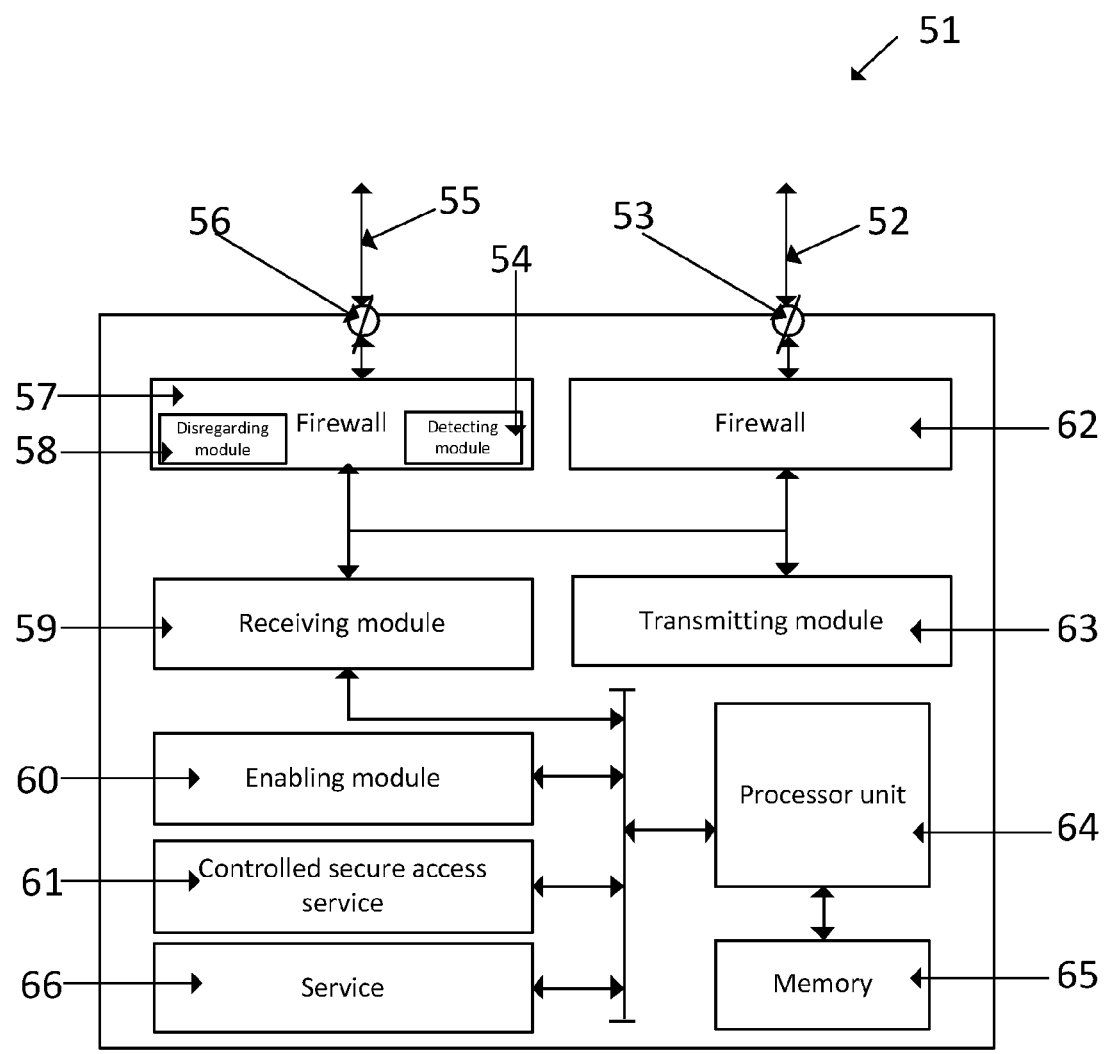
FIG. 3 is a block diagram illustrating a schematic view of an IP server according to the present invention.

FIG. 3 is a schematic view of an IP server 51 according to the present invention. The IP server 51 is arranged to provide a service 66 over a public connection 55, i.e. a connection over the internet. Access to the service 66 is provided to a User Equipment via the public connection 55.

The IP server 51 comprises a processing unit 64 and a memory 65, which processing unit 64 is connected to a receiver module 59, a transmitter module 63, an enabler module 60, a controlled secure access service 61 as well as a service module 66.

Any outgoing or incoming IP traffic passes through Input/Output, I/O, terminal 56 and the firewall 57. The firewall comprises a detector module 54 arranged to detect an irregularity in IP traffic arriving at the IP server 51. An irregularity may be related to a DDoS attack, wherein an enormous amount of packets are sent from multiple hosts towards the IP server 51 with the intention to cause an overload of the IP server 51.

The effect of an overload of the IP server 51 may be that any User Equipment, having or requesting access to the service via the service module 66, experiences slow or no response from the IP server 51. The resources of the IP server 51 may, in such a case, be occupied with processing the DDoS attack, i.e. the IP packets received at the I/O terminal 56.

In case an irregularity is detected by the detector module 54, the disregarder module 58 may decide to disregard any or all IP traffic arriving at the I/O terminal 56. This may be accomplished, for example, by functionally disconnecting the receiver module 59 from the firewall 57, by functionally disconnecting the firewall 57 from the I/O terminal 56, or by dropping any arriving IP packet by the firewall 57.

The enabler module 60 is then operable to enable one or more secondary connections 52 over a private IP network to guarantee that a connected UE is able to have continuous access, or to gain access, to the service provided by the service module 66.

The enabler module 60 may decide to enable secondary connections 52 over private IP networks only to communications service providers which are subscribed to a controlled secure access service 61.

In the present example, the IP packets transmitted over the secondary connection 52 pass through a secondary I/O terminal 53, and are either allowed or denied by a secondary firewall 62.

Figure 4:
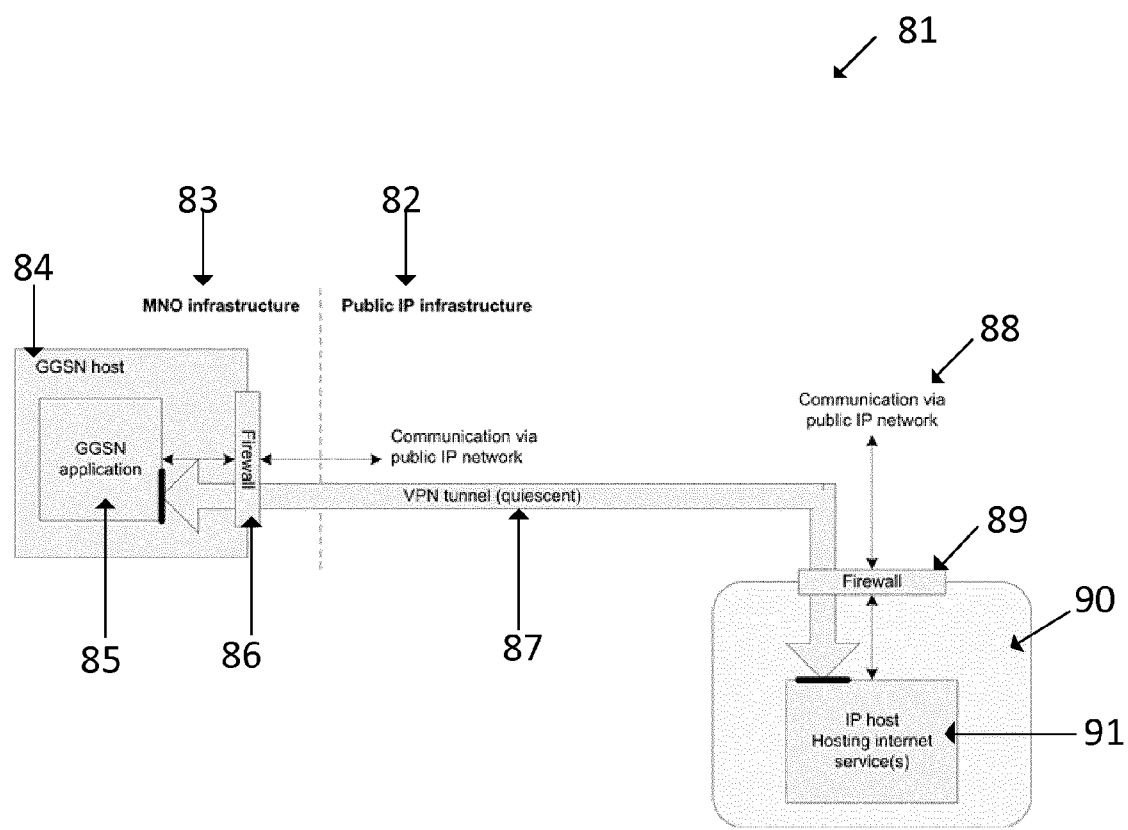
FIG. 4 is a block diagram illustrating a schematic view of a topology according to the present invention, wherein a private IP network between a communications service provider and the IP server is pre-established.

FIG. 4 is a schematic view of a network topology 81 according to the present invention, wherein a private IP network 87 between a communications service provider 83 and the IP server 91 is pre-established.

The IP server 91 monitors, during normal operating conditions, the operational state of the access, of the service provided, to the public IP network, i.e. the internet 82. Such a monitoring may be performed, for example, by the firewall 89 or by the IP server 91.

In the present example, the VPN tunnel 87 is established, but is not used, i.e. it is put in a quiescent state. The GGSN 84 or the PDN-Gw respectively, has obtained an internet address, for example an IP address or a host name address, during establishment of the VPN tunnel 87, which IP address may be used for communication with the service provided by the IP server 91.

The quiescent state of the VPN tunnel 87 entails that the GGSN 84 and the provided service by the IP server 91 do not use the VPN tunnel 87 for any IP data traffic. The VPN tunnel 87 may be used, even before an irregularity is detected, for regular signaling, for example to keep the VPN tunnel 87 alive.

A communication 88 between the IP server 91 and the GGSN 84 is in place via the firewall 89 of the IP server 91, over the public internet 82 and via the firewall 86 of the GGSN 86.

There may be multiple communications service providers 83 which have a VPN tunnel established to the IP server 91. In an example, a plurality of mobile network operators are allowed to establish a VPN tunnel 87 with the IP server 91, while internet service providers are not allowed to do so.

The VPN tunnel 87 will be used for IP traffic after an irregularity is detected in the perimeter network 90, for example by the firewall 89 or the IP server 91. The IP server 91 determines that IP packets may be transmitted and received over the VPN tunnel 87 for the service it provides. Additionally, the IP server 91 may determine that other types of services, utilizing, for example, other type of protocols, are also allowed to use a VPN tunnel 87 for communicating with a communications service provider.

Figure 5:
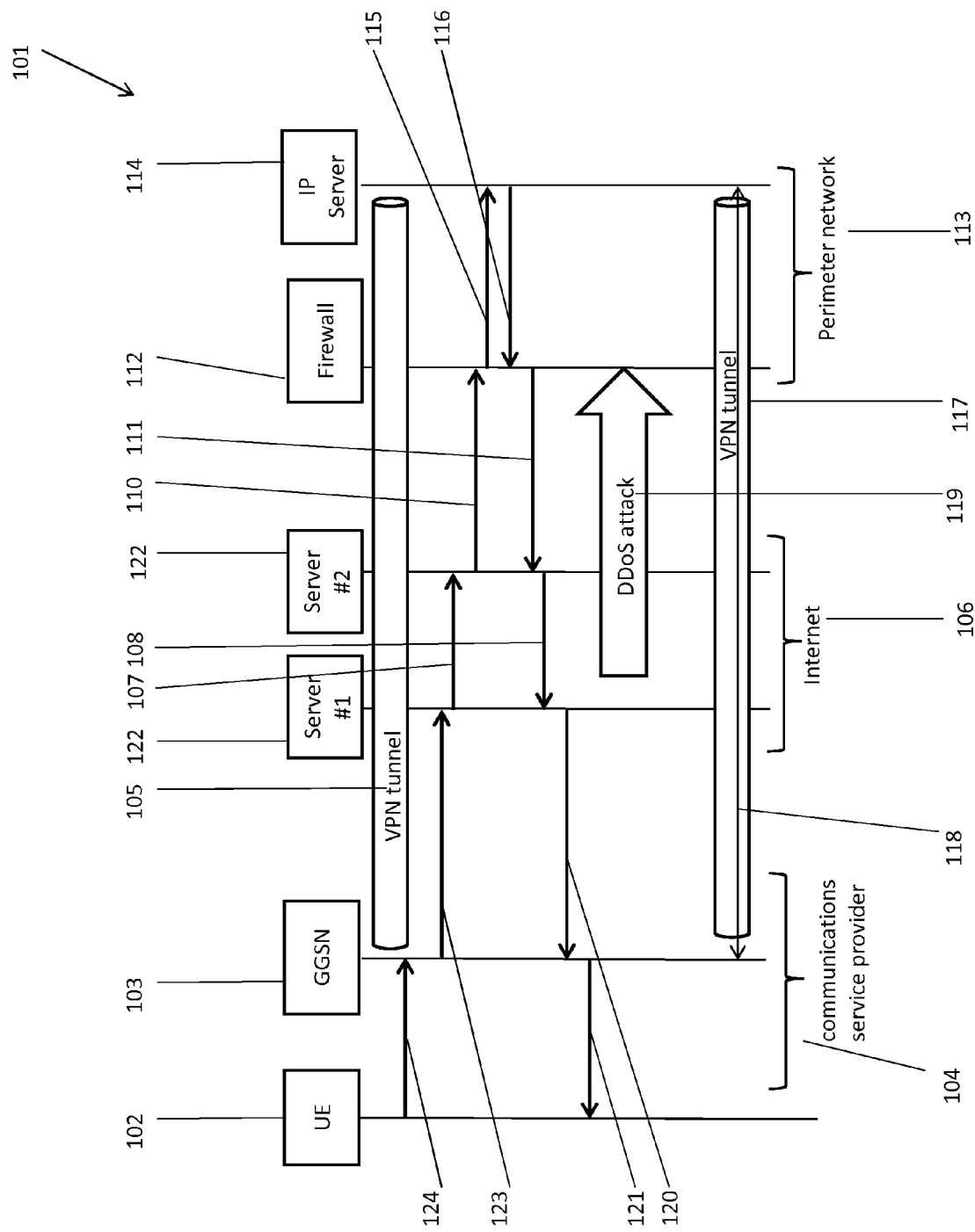
FIG. 5 is a signaling diagram illustrating a schematic view of a method of providing at least one communications service provider a connection to an IP server in a perimeter network, according to the present invention.

FIG. 5 is a schematic view of a method of providing at least one communications service provider 104 a connection to an IP server 114 in a perimeter network 113, according to the present invention. Here, the User Equipment 102 initiates a request 124 for loading a web page at the IP server 114. The request 124 comprises an identification or address of the IP server 114, for example an IP address or a host name address.

The GGSN 103 receives the request, as the GGSN 103 is the first network server in the communications service provider 104 to which the UE 103 communicates, i.e. for data traffic sent to or receive from a Packet data network. As such, in the present example, the communications service provider 104 is a mobile network operator.

The GGSN 103 may perform different types of policy handling, such as IP address assignment, authentication and charging functions, packet routing and transfer, for all its connected UE 102.

The received request for loading the web page 124 is then forwarded 123 by the GGSN 103 to the public IP network, i.e. the internet 106. Several servers 109, 122 comprised in the internet 106 are involved in the request initiated from the UE 102 for loading the web page at the IP server 114. These servers 109, 122 are arranged to forward 107, 110 the request 123 received from the GGSN 103 to the IP server 114.

In the present example, the IP server 114 resides in a perimeter network 113. A perimeter network 113 is a network being shielded or protected from the internet 106. The perimeter network 113 comprises a firewall 112, which is considered to be the first entry point in the perimeter network 113 for all incoming traffic at the perimeter network 113.

The incoming request 110 for loading the webpage at the perimeter network 113 is therefore first received by the firewall 112. The firewall comprises a set of rules to determine whether any incoming or outgoing traffic at/from the perimeter network 113 is to be allowed or not.

Here, the firewall 112 is set to allow all incoming and outgoing IP traffic directed to the service provided by the IP server 114, i.e. the web page. As such, the firewall 112 allows the request 110 for loading the web page, and forwards 115 the request to the IP server 114.

The IP server 114 is arranged to provide the web page, for example in the form of a "home.html" file, based on the request received 115. The "home.html" file is provided to the UE via a same route, i.e. via the firewall 112, the intermediate servers 109, 122 comprised in the internet 106, to the GGSN 103 comprised in the mobile network operator 104, and finally to the UE 102, as indicated with reference numerals 116, 111, 108, 120 and 121.

The above sketched process for loading the web page is repeated several times, i.e. requests to access content of the web page are initiated by the UE several times, before the complete content is loaded at the UE 102.

In the present example, during the process of loading the web page, a DDoS attack 119 is initiated from servers present in the internet 106. The DDoS attack 119 may be initiated from a plurality of servers in the internet at the same time. The DDoS attack 119 shown entails that these plurality of servers repeatedly send enormous amounts of IP packets to the IP server 114 and/or the service provided by the IP server 114, i.e. the web page. The intention of the DDoS attack 119 is to make sure that the service provided by the IP server 114 is no longer available.

The firewall 112 is arranged to at least temporarily block specific or all incoming and outgoing IP traffic from/to the internet 106 once the DDoS attack 119 has been detected, thereby protecting the IP server 114 and the service provided.

The inventors found a solution to the unavailability aspect of the service during the DDoS attack. They noted that the perimeter network 113 should enable a connection 118 to the mobile network operator 104 for the service provided by the IP server 114 over at least one private IP network, i.e. VPN 117.

As such, not only is the IP server 114 and the service provided by the IP server 114 protected from the DDoS attack 119, access to the service can be guaranteed to the UE 102 via the private IP network, i.e. VPN 117, for example a Virtual Private Network.

The present example shows that the VPN tunnel 105 is pre-established between the GGSN 103 and the IP server 114. The VPN 117 is however being enabled, i.e. enabled for being used for communication between the GGSN 103 and the IP server 114, once the DDoS attack 119 is detected.

Figure 6:
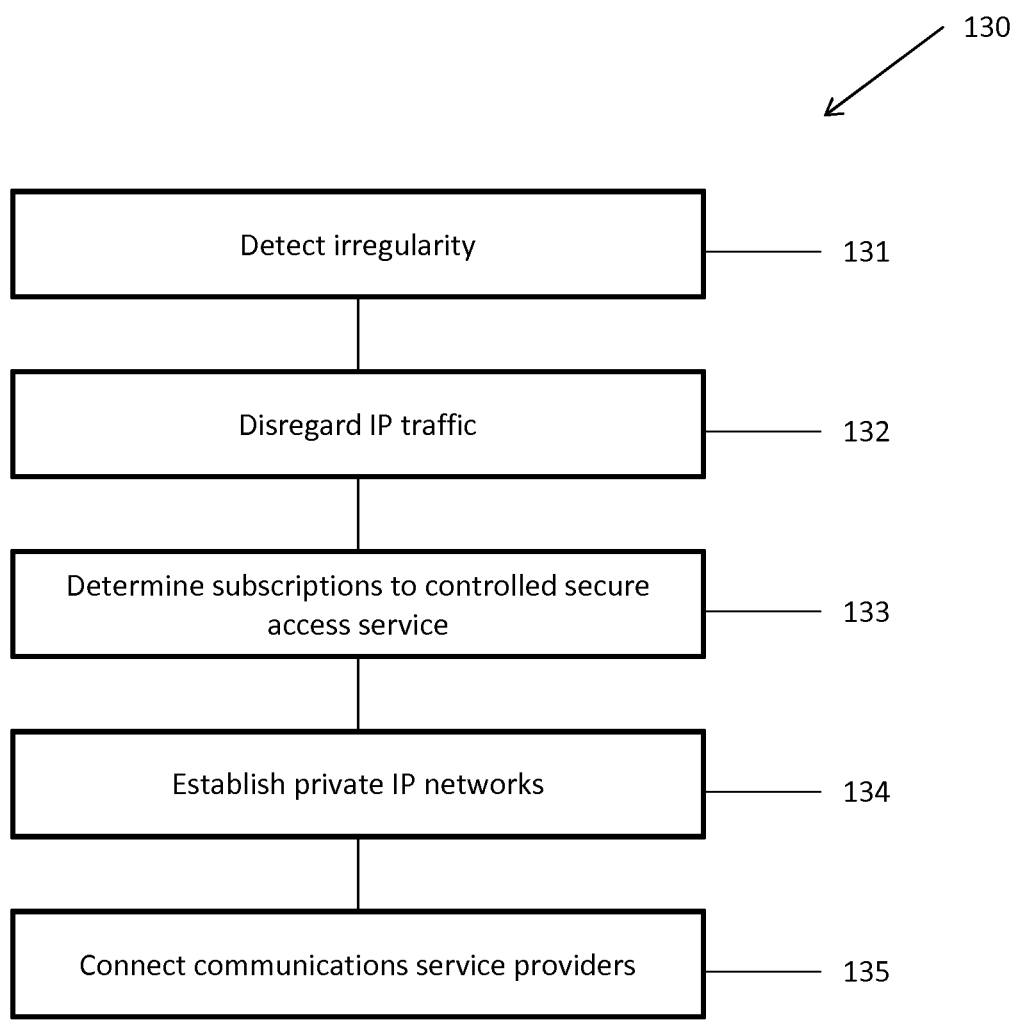
FIG. 6 is a flowchart illustrating a schematic view of the steps performed in a method according to the present invention.

FIG. 6 is a flowchart 130 illustrating a schematic view of the steps performed in a method according to the present invention In a first step, a perimeter network, or more specifically a firewall comprised in the perimeter network, is arranged to detect 131 an irregularity in IP traffic arriving at the perimeter network. The irregularity may, for example, be an overload in IP traffic arriving at the perimeter network or absence of IP traffic arriving at the perimeter network.

Absence of IP traffic arriving at the perimeter network may indicate that there is a failure in the infrastructure in, for example, the internet. Such a failure may lead to IP packets not arriving at the perimeter network.

Second, the IP traffic arriving at the perimeter network over the internet is then disregarded 132 by the firewall. Disregarding 132 of IP traffic may also comprise any of dropping, blocking and redirecting of the arriving IP traffic.

Next, it is determined which communications service providers are subscribed 133 to a controlled secure access service. Such a subscription indicates, amongst other, that the communications service providers are trustworthily such that a private IP network between these subscribed communications service providers and the IP server may be established, or may be activated in the case that such private IP network were pre-established between the respective communications service providers and the perimeter network.

The private IP networks are then actually established 134 between the IP server and the subscribed communications service provider, and the these communications service providers are then connected 135, over the established private IP networks, with the service provided by the IP server.

An advantage of the present invention is that a useful connection between the IP server and the communications service provider is provided after an irregularity, such as a DDoS attack, is detected. As such, the service provided by the IP server can still be accessed.

The advantage of using a private IP network for enabling a connection between the IP server and the communications service provider is that such a private IP network is blocked from the public IP network, resulting in that a DDoS attack can not be directed to the private IP network.

The present invention is not limited to the embodiments as disclosed above, and can be modified and enhanced by those skilled in the art beyond the scope of the present invention as disclosed in the appended claims without having to apply inventive skills.

The invention claimed is:

1. A method of providing a connection between at least one communications service provider and an Internet Protocol (IP) server in a perimeter network, the IP server providing a service over a public IP network, the method comprising the perimeter network:

detecting an irregularity in IP traffic arriving at the perimeter network over the public IP network, wherein the irregularity comprises any of:

overload in IP traffic arriving at the perimeter network over the public IP network;

absence of IP traffic arriving at the perimeter network for the service over the public IP network;

disregarding IP traffic arriving at the perimeter network over the public IP network; and enabling a connection between the IP server and the at least one communications service provider for the service provided by the IP server over at least one private IP network, wherein the enabling the connection between the IP server and the at least one communications service provider comprises the perimeter network:

determining which of the at least one communications service provider are subscribed to a controlled secure access service; and enabling connections between the IP server and subscribed communications service providers for the service provided by the IP server over at least one private IP network.

2. The method of claim 1, wherein the enabling the connection between the IP server and the at least one communications service provider comprises:

establishing the at least one private IP network between the at least one communications service provider and the IP server; and connecting the at least one communications service provider for the service provided by the IP server over the established at least one private IP network.

3. The method of claim 2:

wherein the IP server is providing the service over the public IP network via a first public IP interface comprised in the IP server; and wherein the establishing the at least one private IP network and the connecting the at least one communications service provider are performed over a second IP interface comprised in the IP server.

4. The method of claim 2, wherein the enabling the connection between the IP server and the at least one communications service provider comprises enabling the connection over at least one pre-established private IP network between the at least one communications service provider and the IP server.

5. The method of claim 1, wherein the enabling the connection between the IP server and the at least one communications service provider comprises enabling the connection over the at least one private IP network between the IP server and any of:

a Gateway General Packet Radio Service (GPRS) support Node (GGSN) comprised in the at least one communications service provider; and a Packet Data Network Gateway (PDN-Gw) comprised in the at least one communications service provider.

6. The method of claim 1, wherein the overload in IP traffic arriving at the perimeter network over the public IP network comprises any of volume based overload, protocol based overload, and request based overload.

7. The method of claim 1, wherein the disregarding IP traffic arriving at the perimeter network over the public IP network comprises any of: dropping the IP traffic, blocking the IP traffic, and redirecting the IP traffic.

8. The method of claim 1, wherein the detecting an irregularity in IP traffic arriving at the perimeter network is performed by at least one of a firewall comprised in the perimeter network, the IP server, and the service.

9. A perimeter network configured to provide a connection between an Internet Protocol (IP) server and at least one communications service provider, the perimeter network comprising:

the IP server, the IP server providing a service over a public IP network;

processing circuitry;

memory comprising instructions executable by the processing circuitry whereby the processing circuitry is configured to:

detect an irregularity in IP traffic arriving at the perimeter network over the public IP network, wherein the irregularity comprises any of:

an overload in IP traffic arriving at the perimeter network over the public IP network;

an absence of IP traffic arriving at the perimeter network for the service over the public IP network;

disregard IP traffic arriving at the perimeter network over the public IP network; and enable a connection between the IP server and the at least one communications service provider for the service provided by the IP server over at least one private IP network, wherein to enable the connection, the processing circuitry is configured to:

determine which communications service providers are subscribed to a controlled secure access service; and enable connections to subscribed communications service providers for the service provided by the IP server over private IP networks.

10. The perimeter network of claim 9, wherein the processing circuitry is further configured to:

establish the at least one private IP network between the at least one communications service provider and the IP server, and connect the at least one communications service provider for the service provided by the IP server over the established at least one private IP network.

11. The perimeter network of claim 10:

wherein the IP server is providing the service over the public IP network via a first public IP interface comprised in the IP server;

wherein the processing circuitry is configured to enable a connection to the at least one communications service provider over a second IP interface comprised in the IP server.

12. The perimeter network of claim 9, wherein the processing circuitry is configured to enable the connection between the IP server and the at least one communications service provider by enabling the connection over at least one pre-established private IP network.

13. The perimeter network of claim 9, wherein the processing circuitry is configured to enable the connection over the at least one private IP network between the IP server and any of:

a Gateway General Packet Radio Service (SPRS) Support Node comprised in the at least one communications service provider;

a Packet Data Gateway comprised in the at least one communications service provider.

14. The perimeter network of claim 9, wherein the overload in IP traffic arriving at the perimeter network over the public IP network comprises any of volume based overload, protocol based overload, and request based overload.

15. The perimeter network of claim 9, wherein the processing circuitry is configured to disregard IP traffic arriving at the perimeter network over the public IP network by any of: dropping the IP traffic, blocking the IP traffic, and redirecting the IP traffic.

16. An Internet Protocol (IP) server providing a service over a public IP network, the IP server configured to provide a connection between the IP server and at least one communications service provider, the IP server comprising:
  processing circuitry;
  memory comprising instructions executable by the processing circuitry whereby the processing circuitry is configured to:
    detect an irregularity in IP traffic arriving at the IP server over the public IP network, wherein the irregularity comprises any of:
      an overload in IP traffic arriving at the IP server over the public IP network;
      an absence of IP traffic arriving at the IP server for the service over the public IP network;
    disregard IP traffic arriving at the IP server over the public IP network; and
    enable a connection between the IP server and the at least one communications service provider for the service provided by the IP server over at least one private IP network, wherein to enable the connection, the processing circuitry is configured to:
      determine which communications service providers are subscribed to a controlled secure access service; and
      enable connections to subscribed communications service providers for the service provided by the IP server over private IP networks.

* * * * *

UNITED STATES PATENT AND TRADEMARK OFFICE
CERTIFICATE OF CORRECTION

PATENT NO. : 9,973,530 B2  
APPLICATION NO. : 15/102394  
DATED : May 15, 2018  
INVENTOR(S) : Hobe et al.

Page 1 of 1

It is certified that error appears in the above-identified patent and that said Letters Patent is hereby corrected as shown below:

In the Specification

In Column 10, Line 43, delete "GGSN 86." and insert -- GGSN 84. --, therefor.

In Column 11, Line 1, delete "UE 103" and insert -- UE 102 --, therefor.

In the Claims

In Column 13, Line 40, in Claim 4, delete "claim 2," and insert -- claim 1, --, therefor.

In Column 14, Line 57, in Claim 13, delete "(SPRS)" and insert -- (GPRS) --, therefor.

Signed and Sealed this
Twenty-sixth Day of March, 2019

Andrei Iancu
*Director of the United States Patent and Trademark Office*